United States Patent
Hsu et al.

(10) Patent No.: US 11,036,646 B2
(45) Date of Patent: Jun. 15, 2021

(54) DATA STORAGE DEVICE AND METHOD OF WRITING LOGICAL-TO-PHYSICAL MAPPING TABLE THEREOF

(71) Applicant: Silicon Motion, Inc., Jhubei (TW)

(72) Inventors: Che-Wei Hsu, Taichung (TW); Hui-Ping Ku, Zhubei (TW)

(73) Assignee: SILICON MOTION, INC., Hsinchu County (TW)

( * ) Notice: Subject to any disclaimer, the term of this patent is extended or adjusted under 35 U.S.C. 154(b) by 36 days.

(21) Appl. No.: 16/560,033

(22) Filed: Sep. 4, 2019

(65) Prior Publication Data

US 2020/0089620 A1  Mar. 19, 2020

Related U.S. Application Data

(60) Provisional application No. 62/731,137, filed on Sep. 14, 2018.

(30) Foreign Application Priority Data

Jul. 25, 2019  (TW) ................................. 108126306

(51) Int. Cl.
   *G06F 12/1009*  (2016.01)
(52) U.S. Cl.
   CPC .. *G06F 12/1009* (2013.01); *G06F 2212/7201* (2013.01)
(58) Field of Classification Search
   CPC ......... G06F 12/1009; G06F 2212/7201; G06F 12/0246; G06F 2212/1016; G06F 3/061; G06F 3/0631; G06F 3/0679
   (Continued)

(56) References Cited

U.S. PATENT DOCUMENTS

2004/0260901 A1* 12/2004 Yamagami .......... G06F 11/1466
                                                        711/162
2013/0061017 A1   3/2013 He
                  (Continued)

FOREIGN PATENT DOCUMENTS

TW          201312354 A1   3/2013

OTHER PUBLICATIONS

Shaikh, Z.A.; "Operating System: Memory Management," (https://zuhaib-shaikh.neocities.org/ [Downloads →Course Material → Operating Systems → Teaching Plan, Lecture_Slide-Real Memory Management; pp. 1-53.

*Primary Examiner* — Hashem Farrokh
(74) *Attorney, Agent, or Firm* — McClure, Qualey & Rodack, LLP

(57) ABSTRACT

A data storage device is provided. The data storage device includes: a flash memory, a dynamic random access memory (DRAM), and a memory controller. The flash memory stores a logical-to-physical mapping (L2P) table that is divided into a plurality of group-mapping tables. The memory controller receives a host command from a host, wherein the host command includes one or more pieces of data and one or more corresponding logical addresses. The memory controller writes the data of the host command into active blocks of the flash memory. In response to the memory controller changing the active blocks into unsaved data blocks and a number of the unsaved data blocks being greater than or equal to an unsaved data block count threshold, the memory controller segmentally updates mapping relationships of the data in the unsaved data blocks, and writes the updated group-mapping tables into the flash memory.

14 Claims, 7 Drawing Sheets

(58) Field of Classification Search
USPC .......................................................... 711/206
See application file for complete search history.

(56) References Cited

U.S. PATENT DOCUMENTS

| | | |
|---|---|---|
| 2018/0121344 A1 | 5/2018 | Seo et al. |
| 2018/0260334 A1 | 9/2018 | Asano et al. |
| 2019/0035473 A1* | 1/2019 | Rajamani ................ G06F 3/061 |
| 2019/0087348 A1* | 3/2019 | Liao .................... G06F 12/1009 |

* cited by examiner

DATA STORAGE DEVICE AND METHOD OF WRITING LOGICAL-TO-PHYSICAL MAPPING TABLE THEREOF

CROSS REFERENCE TO RELATED APPLICATIONS

This application claims the benefit of U.S. Provisional Application No. 62/731,137, filed on Sep. 14, 2018. This Application also claims priority of Taiwan Patent Application No. 108126306, filed on Jul. 25, 2019, the entireties of which are incorporated by reference herein.

BACKGROUND OF THE INVENTION

Field of the Invention

The present invention relates to data storage devices and, in particular, to a data storage device and a method of writing a logical-to-physical mapping table thereof.

Description of the Related Art

Flash memory devices typically include NOR flash devices and NAND flash devices. NOR flash devices are random access—a host accessing a NOR flash device can provide the device with any address on its address pins and immediately retrieve data stored in that address on the device's data pins. NAND flash devices, on the other hand, are not random access but serial access. It is not possible for NAND flash devices to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In reality, the NAND flash device always reads complete pages from the memory cells and writes complete pages into the memory cells. After a page of data is read from the array into a buffer inside the device, the host can access the data bytes or words one by one by serially clocking them out using a strobe signal.

In a conventional data storage device, when the host will successively issue multiple write commands to the conventional data storage device to randomly write page data. The conventional data storage device still needs to write updated partial logical-to-physical mapping tables (e.g., regarded as group-mapping tables) into the flash memory at some time points. However, a conventional data storage device cannot control the point in time at which the updated group-mapping tables are written into the flash memory. When the host randomly writes a huge amount of page data into the conventional data storage device, the write performance of the conventional data storage device will be greatly reduced due to the writing of the updated group-mapping tables into the flash memory being irregular, affecting the normal operation of the device by the user.

Accordingly, there is demand for a data storage device and a method of writing a logical-to-physical mapping table to solve the aforementioned problem.

BRIEF SUMMARY OF THE INVENTION

In an exemplary embodiment, a data storage device is provided. The data storage device includes: a flash memory, a dynamic random access memory (DRAM), and a memory controller. The flash memory is configured to store a logical-to-physical mapping (L2P) table, wherein the L2P table is divided into a plurality of group-mapping tables. The DRAM is configured to store the group-mapping tables. The memory controller is configured to receive a host command from a host, wherein the host command comprises one or more pieces of data and one or more corresponding logical addresses. The memory controller writes the pieces of data of the host command into a plurality of active blocks of the flash memory. In response to the memory controller changing the active blocks into a plurality of unsaved data blocks and a unsaved data block count of the unsaved data blocks being greater than or equal to an unsaved data block count threshold, the memory controller segmentally updates mapping relationships of the data in the unsaved data blocks, and writes the updated group-mapping tables into the flash memory.

In some embodiments, the memory controller calculates a predetermined unsaved data block count capable of being rebuilt during power recovery of the data storage device according to a predefined time for the data storage device to enter a ready status, wherein the unsaved data block count threshold is half of the predetermined unsaved data block count.

In some embodiments, when the memory controller is to write a specific data block including the data of the host command into a physical block of the flash memory, the memory controller increases the unsaved data block count by a corresponding count value according to a type of specific data block and physical block, wherein the type of the specific data block and the physical block comprises single-level cells (SLCs), multi-level cells (MLCs), triple-level cells (TLCs), and quadruple-level cells (QLCs), and the count values corresponding to the SLCs, MLCs, TLCs, and QLCs are 1, 2, 3, and 4, respectively.

In some embodiments, the memory controller obtains a data scheduling ratio by dividing a first number of a plurality of logical pages in each data block composed of the data of the host command by a second number of the group-mapping tables corresponding to the logical pages of each data block, and a size of each group-mapping table is equal to that of each logical page.

In some embodiments, when the memory controller is to write the updated group-mapping tables into the flash memory, the memory controller copies the group-mapping table corresponding to each data block to be stored to obtain backup group-mapping tables corresponding to each data block to be stored. Every time that the memory controller has written the first number of logical pages to the active blocks of the flash memory, the memory controller writes the backup group-mapping table corresponding to the first number of logical pages into the flash memory.

In another exemplary embodiment, a method of writing a logical-to-physical mapping (L2P) table, for use in a data storage device is provided. The data storage device includes a flash memory and a dynamic random access memory (DRAM). The flash memory stores the L2P table that is divided into a plurality of group-mapping tables. The method includes the steps of: receive a host command from a host, wherein the host command comprises one or more pieces of data and one or more corresponding logical addresses; writing the pieces of data of the host command into a plurality of active blocks of the flash memory; and in response to the active blocks being changed into a plurality of unsaved data blocks and a unsaved data block count of the unsaved data blocks being greater than or equal to an unsaved data block count threshold, segmentally updating mapping relationships of the data in the unsaved data blocks, and writing the updated group-mapping tables into the flash memory.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
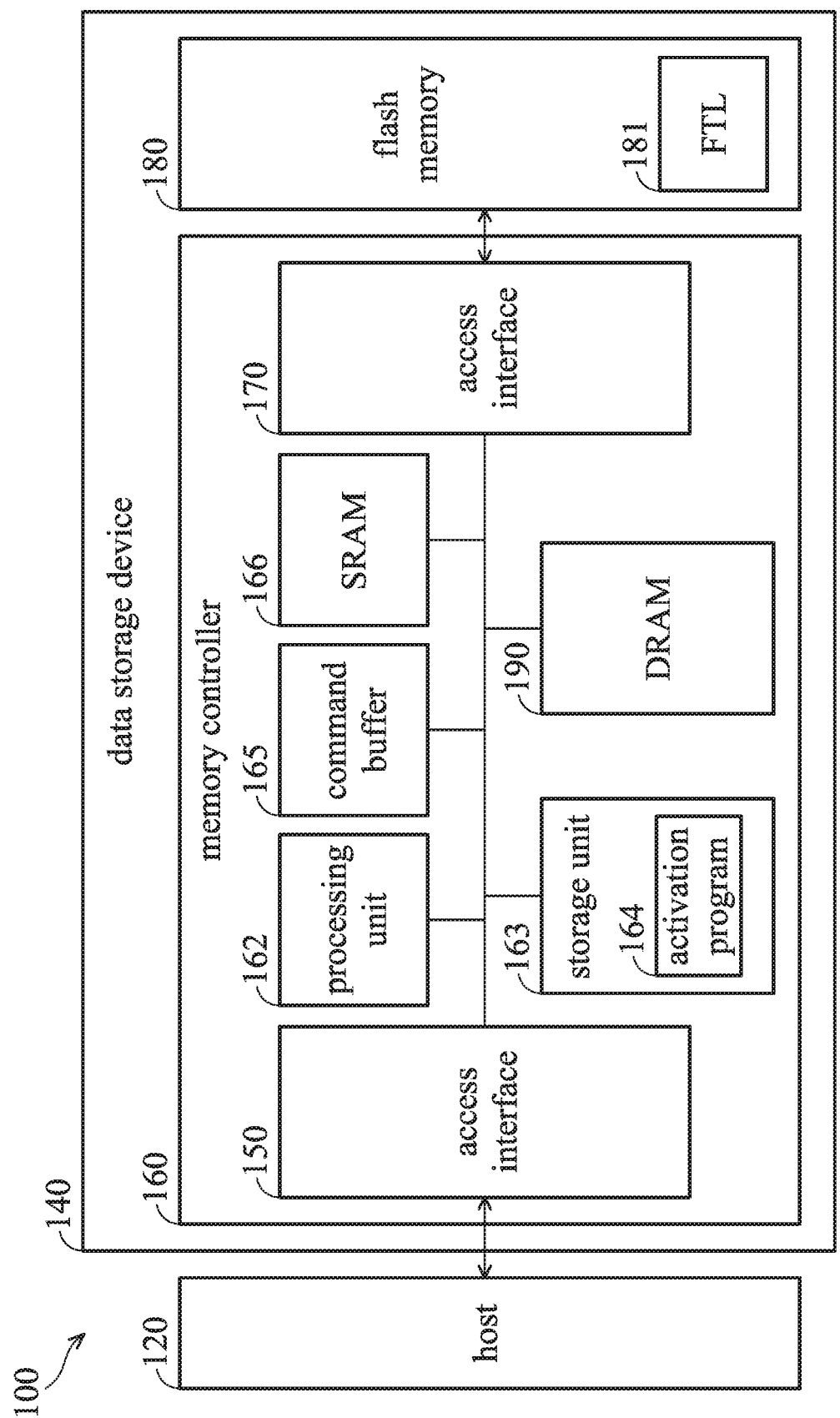
FIG. 1 is a block diagram of an electronic system in accordance with an embodiment of the invention.

FIG. 1 is a block diagram of an electronic system in accordance with an embodiment of the invention. The electronic system 100 may be a personal computer, a data server, a network-attached storage (NAS), a portable electronic device, etc., but the invention is not limited thereto. The portable electronic device may be a laptop, a hand-held cellular phone, a smartphone, a tablet PC, a personal digital assistant (PDA), a digital camera, a digital video camera, a portable multimedia player, a personal navigation device, a handheld game console, or an e-book, but the invention is not limited thereto.

The electronic system 100 includes a host 120 and a data storage device 140. The data storage device 140 includes a memory controller 160, a flash memory 180, and a dynamic random access memory (DRAM) 190. The memory controller 160 includes a computation unit 162, a storage unit 163, and a static random-access memory (SRAM) 166. The computation unit 162 can be implemented in various manners, such as dedicated hardware circuits or general-purpose hardware (for example, a single processor, a multi-processor capable of performing parallel processing, or other processor with computation capability). For example, the computation unit 162 may be implemented by a general-purpose processor or a microcontroller, but the invention is not limited thereto. In addition, the DRAM 190 is not an essential component, and can be replaced by a host memory buffer (HMB). Generally, the size of the data storage space in the DRAM 190 is greater than that in the SRAM 166.

The processing unit 162 of the memory controller 160 may perform operations according to the command issued by the host 120 to write data to a designated address of the flash memory 180 through the access interface 170 or read data from a designated address (e.g., physical address) from the flash memory 180.

In the electronic system 100, several electrical signals are used for coordinating commands and data transfer between the computation unit 162 and the flash memory 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc.

The access interface 170 may communicate with the storage unit 180 using a SDR (Single Data Rate) protocol or a DDR (Double Data Rate) protocol, such as ONFI (open NAND flash interface), DDR toggle, or others. The computation unit 162 may communicate with the host 120 through an access interface 150 using a designated communication protocol, such as USB (Universal Serial Bus), ATA (Advanced Technology Attachment), SATA (Serial ATA), PCI-E (Peripheral Component Interconnect Express), NVME (Non-volatile Memory Express), or others.

The storage unit 163 may be a non-volatile memory such as a read-only memory (ROM), an erasable programmable read-only memory (EPROM), an electrically erasable programmable read-only memory (EEPROM), or an e-fuse, but the invention is not limited thereto. The storage unit 163 may store an activation program 164. The activation program may include boot code or a boot loader that is executed by the processing unit 162, and the controller 160 may be booted up based on the activation program 164 to control operations of the flash memory 180, such as reading in-system programming (ISP) code.

The flash memory 180 may, for example, be a NAND flash memory which is divided into a plurality of logical units. Each logical unit has a corresponding logical unit number (LUN), and each LUN may communicate with the processing unit 162 using the corresponding storage sub-interface. In some embodiments, each LUN may include one more flash memory dies or planes, and each plane may include a plurality of physical blocks.

Figure 2:
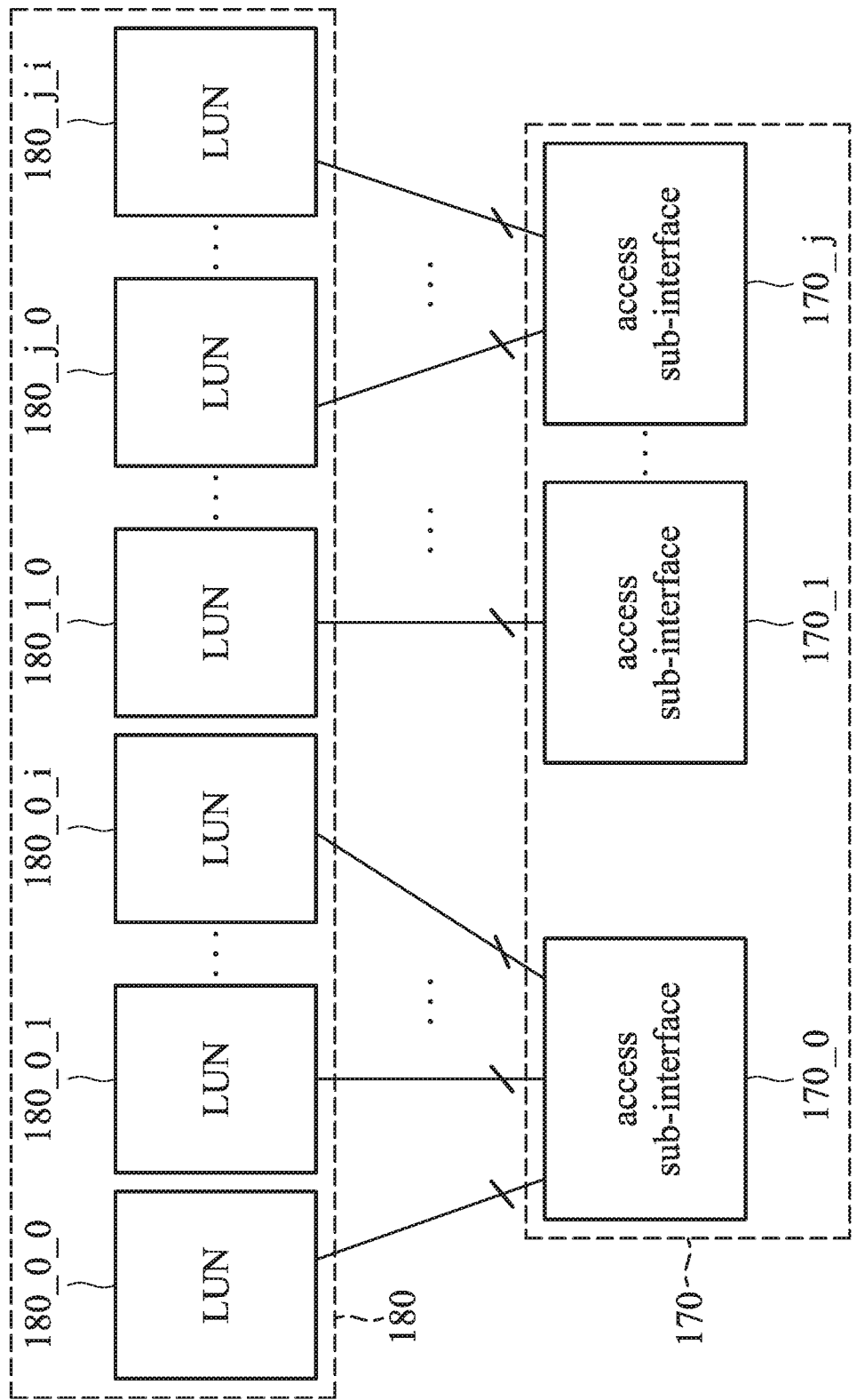
FIG. 2 is a schematic diagram illustrating interfaces to storage units of a flash storage in accordance with an embodiment of the invention.

FIG. 2 is a schematic diagram illustrating access interfaces and storage units in accordance with an embodiment of the invention.

The data storage device 140 may contain j+1 access sub-interfaces 170_0 to 170_j, where the access sub-interfaces may be referred to as channels, and each access sub-interface connects to i+1 LUNs. That is, i+1 LUNs may share the same access sub-interface. For example, assume that the flash memory contains 4 channels (j=3) and each channel connects to 4 storage sub-units (i=3): The flash memory 10 has 16 LUNs 180_0_0 to 180_j_i in total. The processing unit 110 may direct one of the access sub-interfaces 170_0 to 170_j to read data from the designated LUN. Each LUN has an independent CE control signal.

Figure 3:
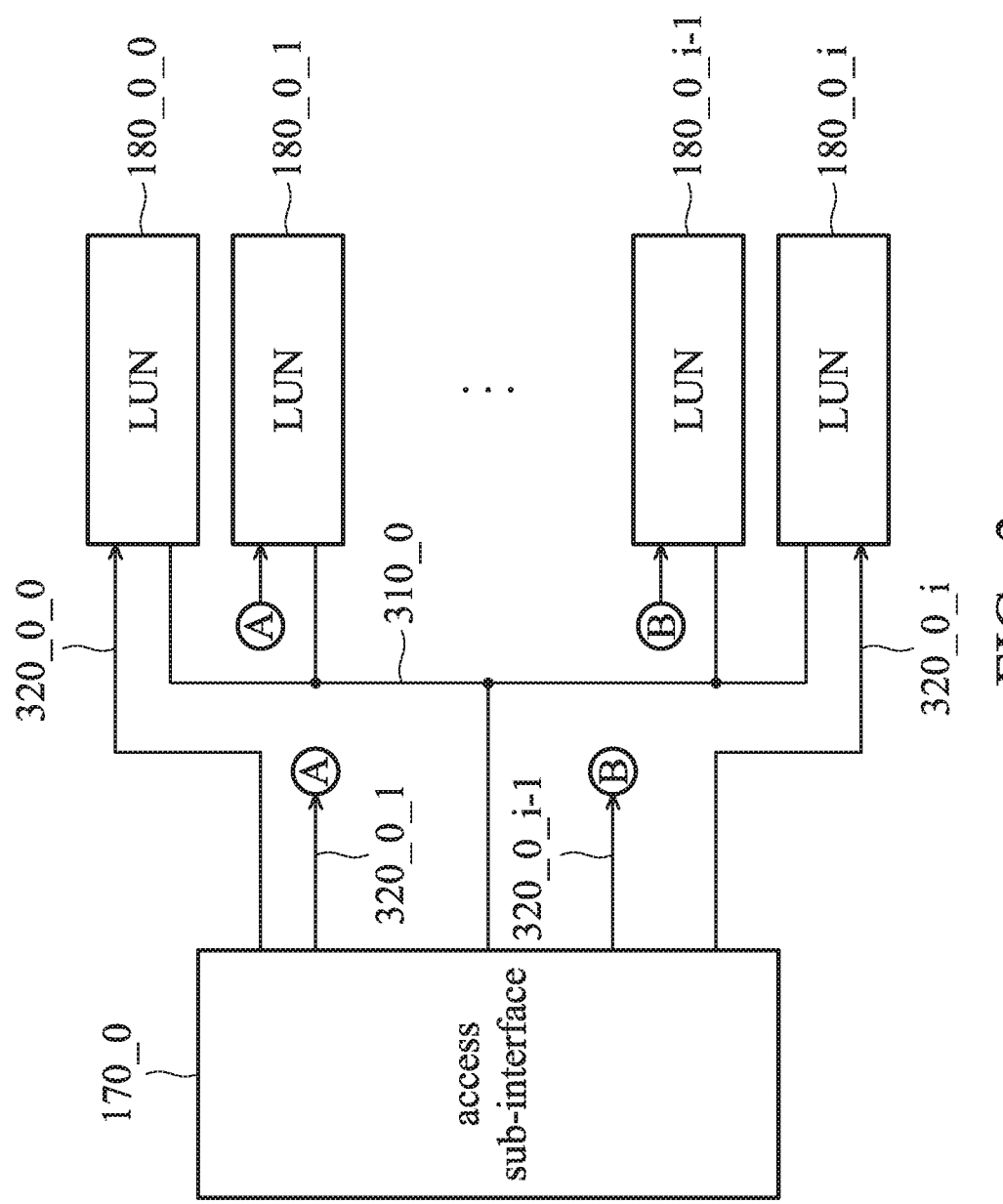
FIG. 3 is a schematic diagram depicting connections between one access sub-interface and multiple LUNs according to an embodiment of the invention.

That is, it is required to enable a corresponding CE control signal when attempting to perform data read from a designated storage sub-unit via an associated access sub-interface. FIG. 3 is a schematic diagram depicting connections between one access sub-interface and multiple LUNs according to an embodiment of the invention. The processing unit 162, through the access sub-interface 170_0, may use independent CE control signals 320_0_0 to 320_0_i to select one of the connected LUNs 180_0_0 and 180_0_i, and then read data from the designated location of the selected LUN via the shared data line 310_0.

In an embodiment, the storage space of the flash memory 180 can be divided into a first portion and a second portion in accordance with the purpose of use. The first portion, for example, can be regarded as a cache space or a page-data buffer, and the single-level cell (SLC) mode is preferably used for data programming to quickly write data into the flash memory 180. The second portion is the main storage space, and it is preferable to use the default mode for data programming, such as multi-level cell (MLC) mode, triple-level cell (TLC) mode, or quadruple-level cell (QLC) mode, but the invention is not limited thereto, so that the LUNs of the flash memory 180 can provide the maximum storage space. The first portion and the second portion are preferably LUNs of the same specification, and the difference is that different modes are used for data programming to achieve different purposes.

For convenience of description, in the following embodiments, the SLC mode is used in the cache space for data programming, and the TLC mode is used in the main storage space for data programming. Accordingly, under the same specifications, the number or data-storage capacity of physical pages in the main storage space is three times that of the physical pages in the cache space. The data-storage capacity of the data blocks in the main storage space is three times that of the data blocks in the cache space, which is due to the fact that three pages of data can be stored in the default on the wordline of the data block, and only one page can be stored in the SLC mode.

In some embodiments, based on the difference between the default mode and the SLC mode, when the memory controller 160 is to write or move the data in the cache space into the main storage space, the pages or blocks of the cache space first need to accumulate until they reach a predetermined number, and then the data in the accumulated pages or blocks is programmed into pages or blocks in the main storage space. For example, the data in three blocks of the cache space is programmed to one block in the main storage space using the TLC mode.

The process of writing data into the flash memory 180 is also called data programming. The data programming is performed in units of pages, and each page can be written with one piece of page data. The size of each page may, for example, be 16 KB, and each page can be divided into four sectors, and the size of each sector may be 4 KB. The erase operation is performed in units of blocks. Depending on the state of use, the blocks in the flash memory 180 can be further divided into idle blocks, active blocks, and data blocks. The active block is the block in which the data is being written, and the active block is changed to the data block when the data is full or no longer written. If all data stored in the data block is invalid or is erased, the data block is changed to an idle block, and the idle block can be changed to the active block.

In an embodiment, in order to improve the performance of the data storage device 140, the memory controller 160 may form a super block using multiple physical blocks, and physical pages located in different physical blocks in the super block may form a super page (SP). The programming operation can be performed in super pages, and each physical super page can be written with a logical super page (i.e., a piece of super page data (SPD)). For example, if an one-way-four-channel architecture is used in the flash memory 180, i=0 and j=3 are set in the architecture of the flash memory 180 in FIG. 2, and each physical super page SP may include four physical pages. That is, each physical super page SP may store four logical pages. If a four-way-two-channel architecture is used in the flash memory 180, i=3 and j=1 are set in the architecture of the flash memory 180 in FIG. 2, and each physical super page SP may include eight physical pages.

In an embodiment, the host 120 may control the data storage device 140 to read or write data of 512 Bytes or 4K Bytes in size (i.e., user data) that is indexed using logical addresses for the logical pages or logical sectors in the access command. For example, the logical addresses may be logical block addresses (LBAs), global host pages (GHPs), host blocks, host pages, etc. While the data storage device 140 is operating, the memory controller 160 may preferably use segments (e.g., 4 KB) to manage data from the host 120 and build/update the L2P table. The L2P table may record the mapping information from the logical addresses to physical addresses, thereby responding to the host command from the host 120, such as the host write command, the host read command, and the like.

If the capacity of the DRAM 190 is limited or the data storage device 140 is not equipped with the DRAM 190 and uses the host memory buffer (HMB) instead, the entire L2P table cannot be completely loaded into the DRAM 190 or the HMB. In this situation, the memory controller 160 may load a set of L2P table into the DRAM 190 or the HMB.

Figure 4:
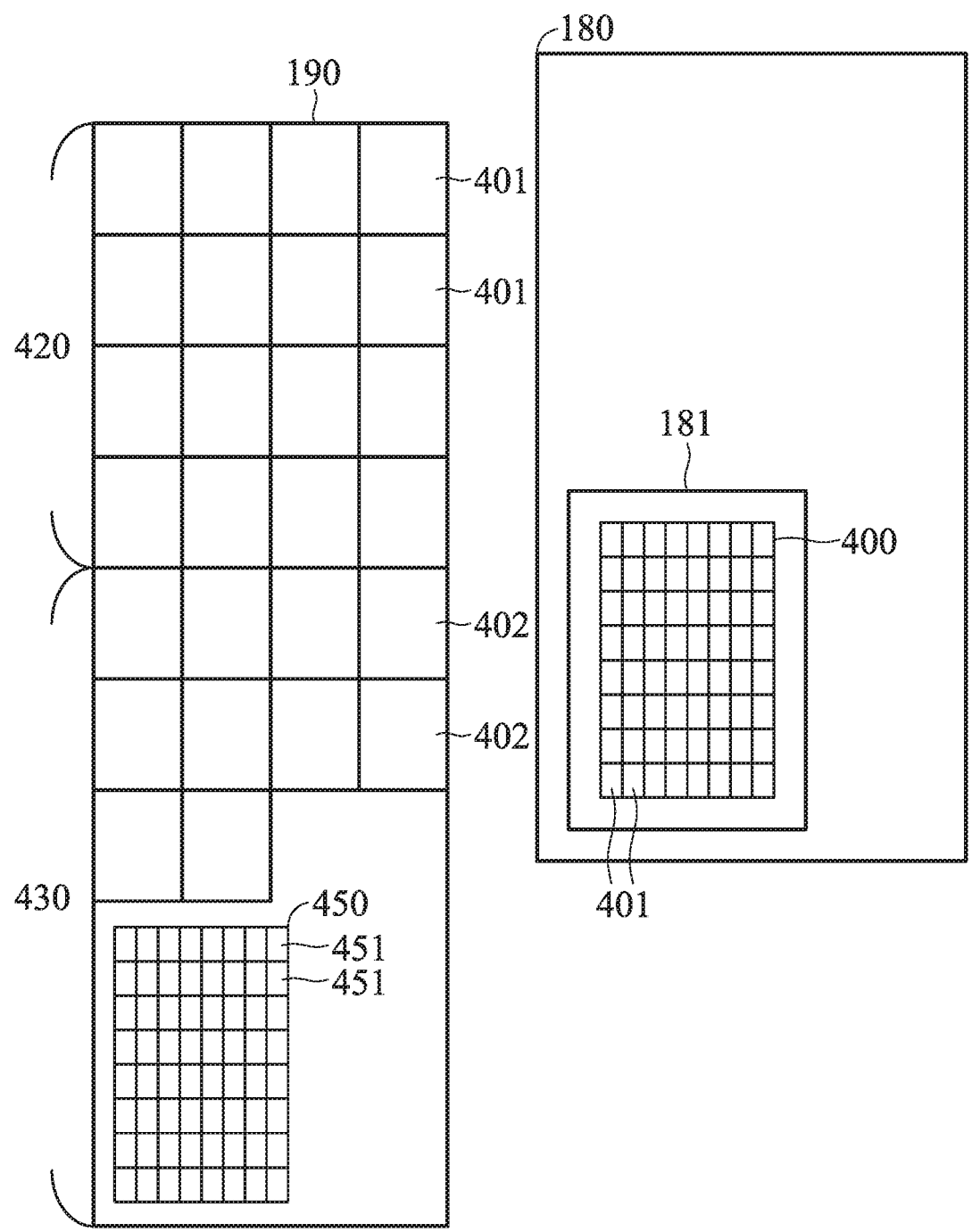
FIG. 4 is a diagram of the logical-to-physical mapping table and group-mapping tables in accordance with an embodiment of the invention.

FIG. 4 is a diagram of the logical-to-physical mapping table and group-mapping tables in accordance with an embodiment of the invention.

In an embodiment, the L2P table 400, for example, can be evenly divided into a plurality of group-mapping tables 401, such as 1024 group-mapping tables 401. The size of each group-mapping table may be 4 KB. Assuming that each entry of each group-mapping table 401 has a size of 4 bits, each group-mapping table 401 may record 1024 pieces of mapping information. In order to facilitate management of group mapping tables, the size of each group mapping table is preferably equal to or smaller than the size of a physical page or a physical sector, which is consistent with the data management unit. In addition, preferably, the memory controller 160 may build group-to-physical (G2F) mapping tables to record the physical addresses of each group-mapping table 401 in the flash memory 180.

The memory controller 160, for example, may store a set of group-mapping table 401 in the L2P table 400 to the first predetermined space 420 in the DRAM 190, such as 16 group-mapping tables 401, as depicted in FIG. 4.

In an embodiment, the host 120 may repeatedly write data into the data storage device 140. If the logical addresses of the data are not continuous, it can be regarded as a "random write". For example, a 1 MB piece of data can be randomly written into the data storage device 140. Thus, the memory controller 160 may update content in one or more group-mapping tables 401 according to the 256 pieces of 4 KB of randomly written data. In addition, in order to manage the group-mapping tables 401, the memory controller 160 may preferably build a group-update bit map 450 in the second predetermined space 430 of the DRAM 190 or SRAM 166, and each group-mapping table 401 has a corresponding modification bit 451 in the group-update bit map 450. In response to any logical-to-physical mapping relationship in a specific group-mapping table 401 in the DRAM 190 or HMB has been updated, the memory controller 160 may set the corresponding modification bit 451 in the group-update bitmap 450 to 1, thereby indicating that the mapping relationship in the specific group-mapping table 401 has been updated.

In an embodiment, the memory controller 160 may write end-of-block (EOB) information into the last page of the active block. Meanwhile, the active block is changed to the data block, and the memory controller 160 may update the mapping relationship of the data stored in the aforementioned data block into the group-mapping table 401 in the flash memory 180. If the mapping relationship of the data stored in the aforementioned data block into the group-mapping table 401 in the flash memory 180 has not been updated yet, the aforementioned data block will be labeled as an "unsaved data block".

Under the normal shutdown procedure, the memory controller 160 has sufficient time to update the mapping relationship of the data stored in the data block to the corresponding group-mapping table 401 in the DRAM 190, and write the updated group-mapping table 401 in the DRAM 190 or HBM into the main storage space. In this case, the L2P table 400 and group-mapping tables 401 stored in the main storage space are up-to-date and correct.

If an abnormal power-off event (e.g., a sudden power-down event) occurs, the memory controller 160 does not have enough time to update the mapping relationship of the data stored in the data block to the group-mapping table 401 or does not have enough time to write the updated group-mapping tables 401 in the DRAM 190 or HBM into the main storage space, resulting in generation of the unsaved data block. Accordingly, at the time of power recovery, the memory controller 160 has to read the EOB information in the unsaved data block, thereby rebuilding (or updating) the L2P table 400 and/or group-mapping tables 401. However, the process of rebuilding the L2P table 400 and/or group-mapping tables 401 takes a lot of time. If the data storage device 140 cannot complete the rebuilding of the L2P table 400 within a predetermined time to enter a ready status, this will cause the host 120 to determine that the data storage device 140 is not functioning properly. For example, data storage devices of different models or different capacities may have different predetermined times, which may be referred to as a "drive ready time", for example, between 2 and 20 seconds.

In the first embodiment, when the unsaved data block count C2 in the DRAM 190 or HMB has reached a predetermined number, such as 16, the memory controller 160 may update the mapping relationship of the data stored in the unsaved data block to the group-mapping table 401, and write the updated group-mapping table 401 into the main storage space of the flash memory 180. More precisely, the updated group-mapping table 401 is written into the system blocks in the main storage space of the flash memory 180, where the system blocks is configured to store system information such as group-mapping tables 401 or operation parameters. In the aforementioned process, the memory controller 160 may first determine whether there is no host command in the queue of the command buffer 165 (e.g., a first-in-first-out (FIFO) buffer) indicating an empty state of the FIFO buffer. If there is no host command in the queue of the command buffer 165, the memory controller 160 may output a write command to the command buffer 165, and execute the write command to write the updated group-mapping table 401 into the main storage space of the flash memory 180.

That is, in the embodiment, the memory controller 160 may preferentially execute the host command queued in the command buffer 165. When there is no host command in the command buffer 165, the memory controller 160 may then output the write command to the command buffer 165 to write the updated group-mapping table 401 into the main storage space. In addition, once the memory controller 160 has started writing the updated group-mapping table 401 to the main storage space, the memory controller 160 may utilize a hardware timer to calculate time, and finishes writing the updated group-mapping table 401 before the predetermined time is reached, thereby controlling the number of updated group-mapping tables 401 to be written to maintain the performance of the data storage device 140.

However, in the embodiment, the memory controller 160 cannot control the entry time point at which the writing of the updated group-mapping table 401 is started, so the write performance of the data storage device 140 is affected by interaction between the number of host commands from the host 120 and the number of write commands to write the updated group-mapping tables 401, resulting in unstable write performance. If the host 120 issues a huge amount of host commands which are host write commands, this will result in an increase in the unsaved data block count C2. If the memory controller 160 stops executing the host commands and starts updating the group-mapping table 401, it will result in severe degradation of the write performance of the data storage device 140.

In this situation, the memory controller 160 is incapable of controlling the unsaved data block count C2. If an abnormal power-off event happens to the data storage device 140, after power recovery, the memory controller 160 has to read a large amount of EOB information in the unsaved data blocks to rebuild the L2P table 400. This will significantly increase the required time for the data storage device 140 to enter the ready status.

In the second embodiment, the memory controller 160 may calculate a default unsaved block data count C1 according to a predetermined time required for the data storage device 140 to enter the ready status. For example, if the memory controller 160 processes an unsaved data block for n milliseconds (ms), and the time allocated for rebuilding the data blocks may, for example, be 10*n ms when the data storage device 140 is in the power recovery procedure, it indicates that the predetermined unsaved data block count C1 that the memory controller 160 can process when the power is restored is 10. In addition, the memory controller 160 may also determine the trigger point to write the updated group-mapping table 401. For example, the unsaved data block count threshold is equal to half of the predetermined unsaved data block count C1. That is, in the embodiment, after the memory controller 160 has processed 5 unsaved data blocks, the memory controller 160 will start writing the updated group-mapping tables 401 to the main storage space of the flash memory 180.

During operating of the data storage device 140, when the host 120 repeatedly performs access operations (e.g., write operations) to the data storage device 140, the memory controller 160 will not only update the group-mapping tables 401 and group-update bit map 450 in the DRAM 190, but also calculate and monitor the value of the unsaved data block count C2. Since the data storage capacity of the data blocks in the main storage space is three times that of the cache space, the unsaved data block count C2 calculated by the memory controller 160 may differ due to there being different types of unsaved data blocks. For example, if the unsaved data block is in the cache space, the unsaved data block count C2 is increased by 1. If the unsaved data block is in the main storage space, the unsaved data block count C2 is increased by 3. That is, the type of unsaved data block is determined by the memory controller 160, and is not limited to the SLC and TLC. The memory controller 160 may increase the corresponding count value of the unsaved data block count C2 according to the type of unsaved data block. For example, the count values corresponding to the SLC, MLC, TLC, and QLC are 1, 2, 3, and 4, respectively. Accordingly, the unsaved data block count C2 calculated by the memory controller 160 can match the actual amount of data.

Figure 5:
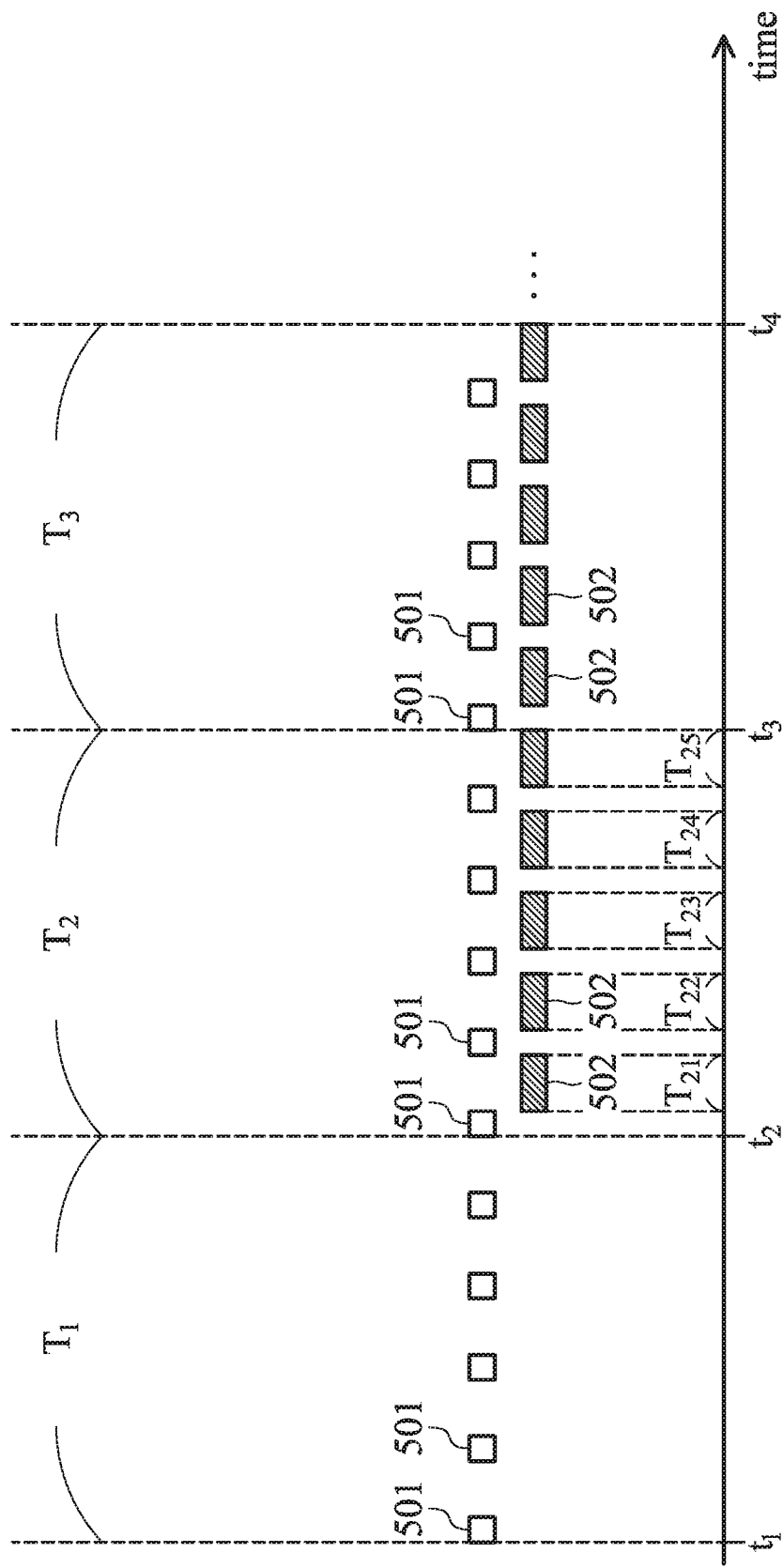
FIG. 5 is a diagram of a scheduled writing mechanism of the L2P table in accordance with an embodiment of the invention.

FIG. 5 is a diagram of a scheduled writing mechanism of the L2P table in accordance with an embodiment of the invention.

At time t1, the host 120 performs a write operation on the data storage device 140. For example, the host 120 may issue multiple write commands into the data storage device 140 to write 1 MB of data into the data storage device 140. During time period T1 (i.e., from time t1 to t2), the memory controller 160 repeatedly executes the write commands from the host 120, and also generates unsaved data blocks (e.g., block 501), and calculates the unsaved data block count C2.

At time t2, in response to the unsaved data block count C2 being greater than or equal to the unsaved data block count threshold, such as the unsaved data block count threshold=5, the memory controller 160 start to process the unsaved data blocks. That is, time t2 is the trigger point to write the updated group-mapping tables 401.

During time period T2 (i.e., from time t2 to t3), the memory controller 160 starts to process the unsaved data blocks, and generates one or more updated group-mapping tables 401, such as 10 updated group-mapping tables 401. Afterwards, the memory controller 160 copies the one or more updated group-mapping tables 401 from the first predetermined space 420 to the second predetermined space 430, where the one or more group-mapping tables 401 that have been copied to the second predetermined space 430 can be regarded as backup group-mapping tables 402. The memory controller 160 does not modify the content in the backup group-mapping tables 402, but instead writes the backup group-mapping tables into the flash memory 180 during time period T2, as shown in block 502. It should be noted that the host 120 can still perform write operations on the data storage device 140 during time period T2, but the memory controller 160 only updates the group-mapping tables 401 in the first predetermined space 420 instead of the backup group-mapping tables 402 in the second predetermined space 430.

Assuming that an unsaved data block in the cache space (e.g., composed of SLCs) includes M logical pages, five unsaved data blocks includes a total of 5M logical pages. In addition, the mapping relationships between 5M logical pages to 5M physical pages, for example, require 10 group-mapping tables for recording. Accordingly, the memory controller 160 can calculate the amount of data being written (e.g., 5M logical pages) and the number of backup group-mapping tables 402 to be written (e.g., 10 backup group-mapping tables 402) during time period T1 (e.g., from time t1 to t2), and obtain a data scheduling ratio R by dividing the amount of data being written by the number of backup group-mapping tables 402, such as R=5M/10=1M/2. Because the data or backup group-mapping tables 402 are written into pages of blocks in the flash memory 180, the data scheduling ratio R can not only be expressed as the ratio of the written data and the number of written backup group-mapping tables 402, but also expressed as the number of pages of data written into the flash memory 180.

Thus, when the memory controller 160 plans the write schedule of time period T2, the operations in block 502 may include first writing a write command of M pages of data to the command buffer 165, and then issuing another write command of two backup group-mapping tables 402 to the command buffer 165. Alternatively, the memory controller 160 may first write a write command of two backup group-mapping tables 402 into the command buffer 165, and then issue another write command of M pages of data to the command buffer 165.

The write operation of M pages of data accompanied by two backup group-mapping tables 402 (i.e., as shown in block 502) is repeatedly 5 times. For example, 5M pages of data and two backup group-mapping tables 402 are written into the flash memory 180 during time periods T21, T22, T23, T24, and T25, respectively. Thus, the memory controller 160 is capable of writing a total of 5M pages of data and 10 backup group-mapping tables 402 into the flash memory 180 during time period T2. It should be noted that the aforementioned data scheduling ratio R can be determined based on the size of the data block, and the size and alignment of the group-mapping table 401 (e.g., each group-mapping table 401 is aligned with the logical address), and the invention is not limited to the aforementioned data scheduling ratio R.

It should be noted that, during time period T2, the host 120 may repeatedly issue host commands (e.g., host write commands) to the data storage device 140, and the memory controller 160 may update the group-mapping tables 401 in the DRAM 190 during time period T2. Accordingly, the memory controller 160 may perform the host command in an interleaved and segmented fashion during time period T2, including updating the group-mapping tables 401 in the first predetermined space 420, writing pages of data into the flash memory 180, and writing the backup group-mapping tables 402 in the second predetermined space 430 into the flash memory 180. Since the memory controller 160 executes the host commands and update (and write) the backup group-mapping tables 402 in an interleaved and segmented fashion, the write performance of the data storage device 140 can be kept at a stable state. Even when a pressure test of 4K random write operations is executed, it will not cause a sudden drop in the write performance of the data storage device 140, thereby stabilizing the write performance of the data storage device 140.

The memory controller 160 is capable of controlling the time point of writing pages of data and the backup group-mapping tables 402 according to the data scheduling ratio R. In addition, the memory controller 160 may also control, according to the data scheduling ratio R, the time point when the write operations of M pages of data and 2 corresponding backup group-mapping tables 402 as the trigger point of the next write operation. Specifically, as depicted in FIG. 5, at time t3 when the time period T2 ends, it indicates that the accumulated unsaved data block count is greater than or equal to the unsaved data block count threshold. Thus, in addition to 5 write operations of M pages of data and corresponding two backup group-mapping tables 402 being completed at time t3, the next scheduled write mechanism is also triggered, and the memory controller 160 may perform another 5 write operations of writing M pages of data and corresponding two backup group-mapping tables 402 during time period T3, and so on.

In addition, when the memory controller 160 determines that the host 120 has not issued any host command to the data storage device 140 for more than a predetermined time, the memory controller 160 may actively write the remaining updated group-mapping tables 401 in DRAM 190 into the flash memory 190.

Figure 6A:
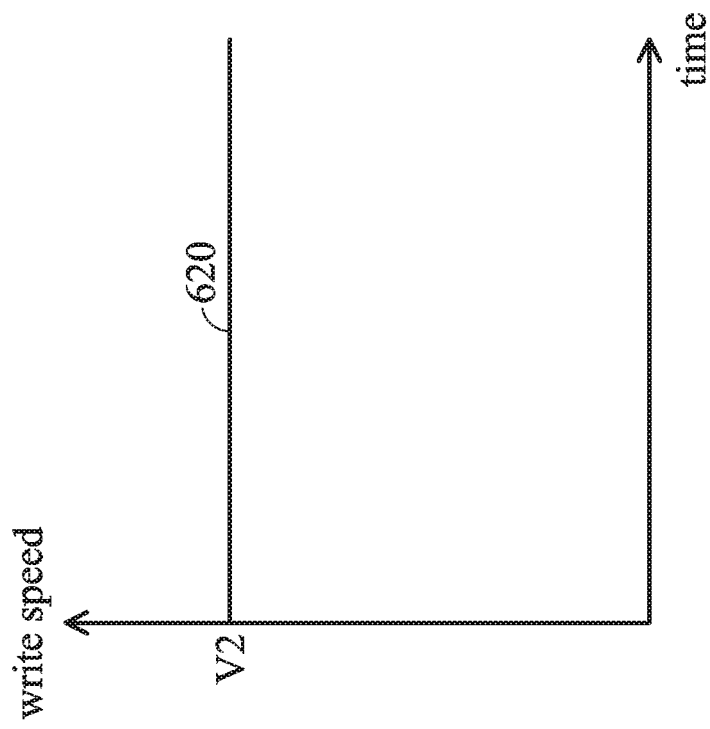
FIG. 6A is a diagram of a curve of write performance of the data storage device in accordance with the first embodiment of the invention.
Figure 6B:
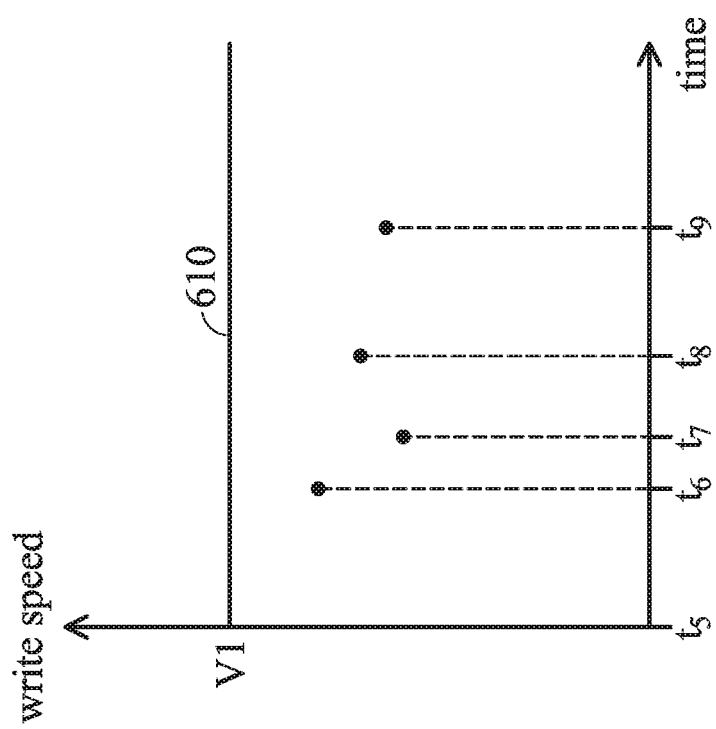
FIG. 6B is a diagram of a curve of write performance of the data storage device in accordance with the second embodiment of the invention.

FIG. 6A is a diagram of a curve of write performance of the data storage device in accordance with the first embodiment of the invention. FIG. 6B is a diagram of a curve of write performance of the data storage device in accordance with the second embodiment of the invention.

In the first embodiment, since the memory controller 160 cannot control the entry time point to perform the write operation of the group-mapping tables 401, the write performance of the data storage device 140 may suddenly drop due to the effects of the write operation by the host 120 and the writing of the group-mapping tables 401 into the flash memory 180 by the memory controller 160, as depicted in FIG. 6A. For example, when the memory controller 160 start to write data into the active blocks, the write speed of the data storage device 140 can be maintained at a constant value V1, as shown in curve 610 in FIG. 6A. However, when the memory controller 160 writes the updated group-mapping tables 401 into the flash memory 180, for example, at times t6, t7, t8, t9, etc., it may cause a severe slowdown of the write speed of the data storage device 140.

In the second embodiment, the memory controller 160 may execute the host commands (e.g., host write commands) from the host 120 and the write operations of the backup group-mapping tables 402 in an interleaved and segmented fashion according to the data scheduling ratio R. Accordingly, the write speed of the data storage device 140 can be maintained at a constant value V2 from time t5 to t9, as shown in curve 620 in FIG. 6B, wherein the constant value V2 is slightly lower than the constant value V1. However, the variation of curve 620 is significantly less than curve 610, and it indicates that the write speed of the data storage device 140 is stable in the second embodiment.

Figure 7:
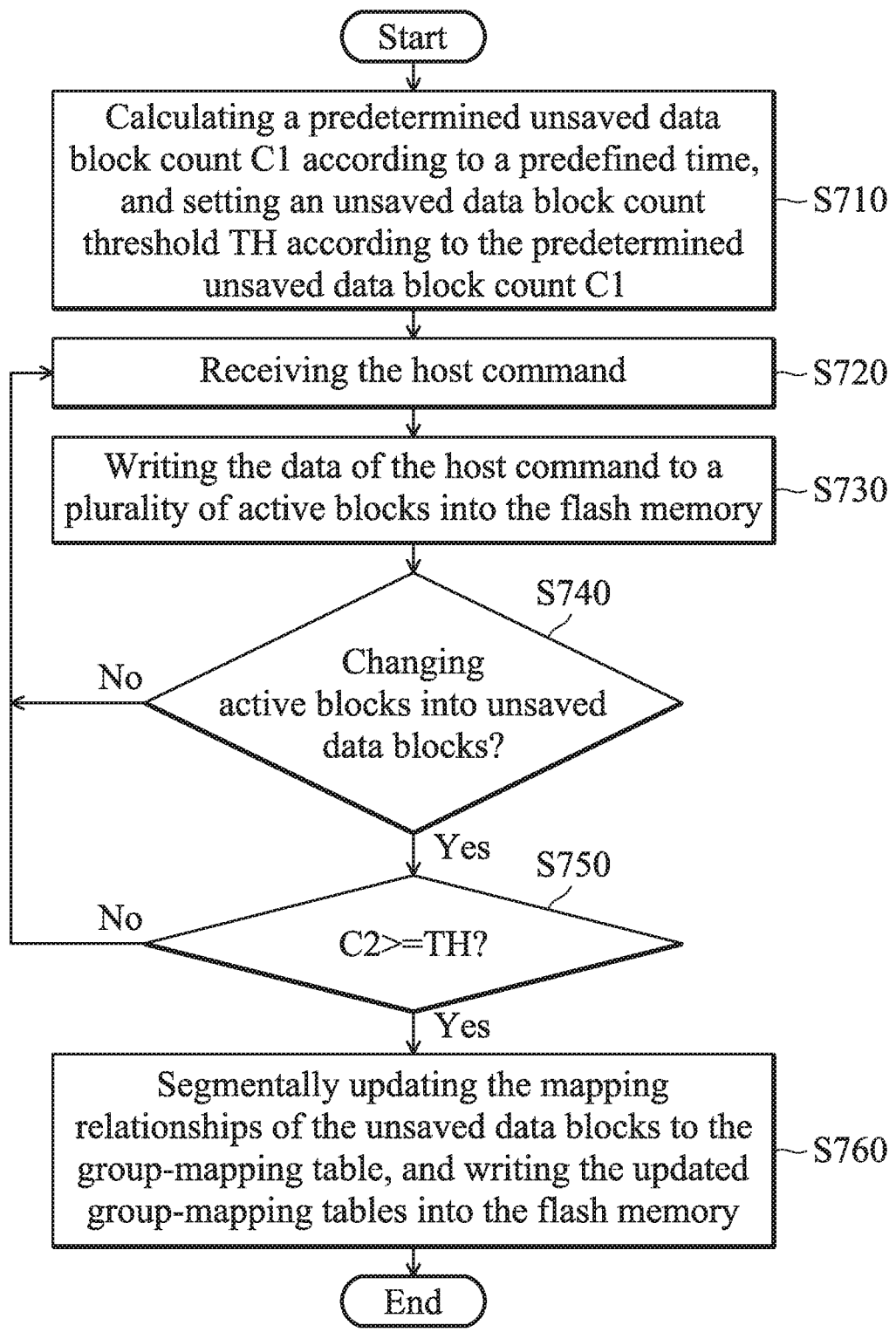
FIG. 7 is a flow chart of a method of writing a logical-to-physical mapping table in accordance with an embodiment of the invention.

FIG. 7 is a flow chart of a method of writing a logical-to-physical mapping table in accordance with an embodiment of the invention.

In step S710, the memory controller 160 calculates a predetermined unsaved data block count C1 according to a predefined time, and sets the unsaved data block count threshold TH according to the predetermined unsaved data block count C1, wherein the unsaved data block count threshold TH, for example, is equal to half of the predetermined unsaved data block count C1. In addition, the unsaved data blocks include EOB information, but the mapping relationships of the data stored in the unsaved data blocks have not been updated to the group-mapping table 401.

In step S720, the memory controller 160 receive a host command (e.g., a host write command), wherein the host command includes one or more pieces of data (e.g., logical page of data or super page of data) and one or more corresponding logical addresses.

In step S730, the memory controller 160 write the data of the host command into a plurality of active blocks in the flash memory 180.

In step S740, the memory controller 160 determines whether to change the active blocks into unsaved data blocks. If the memory controller 160 determines to change to active blocks to the unsaved data blocks, step S750 is performed. If the memory controller 160 determines not to change to active blocks to the unsaved data blocks, step S720 is performed. For example, the memory controller 160 may write the data of the host command into the current active block of the flash memory 180. When the physical pages of the current active block is filled with data (e.g., may include or not include EOB information) but the mapping relationships of the data stored therein have not been updated to the group-mapping table 401, the current active block can be regarded as unsaved data block. When the physical pages of the current active block is filled with data (e.g., may include or not include EOB information), the memory controller 160 may select the next active block to which the memory controller 160 continues to write the data of the host command.

In step S750, the memory controller 160 determines whether the unsaved data block count C2 is greater than or equal to the unsaved data block count threshold TH. If the unsaved data block count C2 is greater than or equal to the unsaved data block count threshold TH, step S760 is performed. If the unsaved data block count C2 is smaller than the unsaved data block count threshold TH, step S720 is performed.

In step S760, the memory controller 160 segmentally updates the mapping relationships of the unsaved data blocks to the group-mapping table 401 in the DRAM 190, and writes the updated group-mapping tables 401 into the flash memory 180, wherein the updated group-mapping tables 401 may, for example, be the backup group-mapping tables 402 shown in FIG. 4. The memory controller 160 may execute the host command from the host 120 and the write operation of the backup group-mapping tables 402 in an interleaved and segmented fashion according to the data scheduling ratio R.

In view of the above, a data storage device and a method of writing a logical-to-physical mapping table are provided. The data storage device and method are capable of, according to the data scheduling ratio R, evenly scheduling the updating operations of the data pages of the host write command from host 120 and the write operations of writing the corresponding backup group-mapping tables into the flash memory. Accordingly, even when a pressure test of 4K random write operations is executed, it still does not cause a sudden drop in the write performance of the data storage device, thereby stabilizing the write performance.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a flash memory, configured to store a logical-to-physical mapping (L2P) table, wherein the L2P table is divided into a plurality of group-mapping tables;
a dynamic random access memory (DRAM), configured to store the group-mapping tables; and
a memory controller, configured to receive a host command from a host, wherein the host command comprises one or more pieces of data and one or more corresponding logical addresses,
wherein the memory controller writes the pieces of data of the host command into a plurality of active blocks of the flash memory;
wherein in response to the memory controller changing the active blocks into a plurality of unsaved data blocks and an unsaved data block count of the plurality of unsaved data blocks being greater than or equal to an unsaved data block count threshold, the memory controller updates mapping relationships of the data in the plurality of unsaved data blocks in segments into the group-mapping tables, and writes the updated group-mapping tables into the flash memory.

2. The data storage device as claimed in claim 1, wherein the memory controller calculates a predetermined unsaved data block count capable of being rebuilt during power recovery of the data storage device according to a predefined time for the data storage device to enter a ready status, wherein the unsaved data block count threshold is half of the predetermined unsaved data block count.

3. The data storage device as claimed in claim 2, wherein when the memory controller is to write a specific data block including the data of the host command into a physical block of the flash memory, the memory controller increases the unsaved data block count by a corresponding count value according to a type of specific data block and physical block.

4. The data storage device as claimed in claim 3, wherein the type of specific data block and physical block comprises single-level cells (SLCs), multi-level cells (MLCs), triple-level cells (TLCs), and quadruple-level cells (QLCs), and the count value corresponding to the SLCs, MLCs, TLCs, and QLCs are 1, 2, 3, and 4, respectively.

5. The data storage device as claimed in claim 1, wherein the memory controller obtains a data scheduling ratio by dividing a first number of a plurality of logical pages in each data block composed of the data of the host command by a second number of group-mapping tables corresponding to the logical pages of each data block, and a size of each group-mapping table equals that of each logical page.

6. The data storage device as claimed in claim 5, wherein when the memory controller is to write the updated group-mapping tables into the flash memory, the memory controller copies the group-mapping table corresponding to each data block to be stored to obtain backup group-mapping tables corresponding to each data block to be stored.

7. The data storage device as claimed in claim 6, wherein every time that the memory controller has written the first number of logical pages to the active blocks of the flash memory, the memory controller writes the backup group-mapping table corresponding to the first number of logical pages into the flash memory.

8. A method of writing a logical-to-physical mapping (L2P) table, for use in a data storage device, wherein the data storage device comprises a flash memory and a dynamic random access memory (DRAM), and the flash memory stores the L2P table that is divided into a plurality of group-mapping tables, the method comprising:
receive a host command from a host, wherein the host command comprises one or more pieces of data and one or more corresponding logical addresses;
writing the pieces of data of the host command into a plurality of active blocks of the flash memory; and
in response to the active blocks being changed into a plurality of unsaved data blocks and a unsaved data block count of the plurality of unsaved data blocks being greater than or equal to an unsaved data block count threshold, segmentally updating mapping relationships of the data in the plurality of unsaved data blocks into the group-mapping tables, and writing the updated group-mapping tables into the flash memory.

9. The method as claimed in claim 8, further comprising:
calculating a predetermined unsaved data block count capable of being rebuilt during power recovery of the data storage device according to a predefined time limit for the data storage device to enter a ready status, wherein the unsaved data block count threshold is half of the predetermined unsaved data block count.

10. The method as claimed in claim 9, further comprising:
when a specific data block including the data of the host command is to be written into a physical block of the flash memory, increasing the unsaved data block count by a corresponding count value according to a type of specific data block and physical block.

11. The method as claimed in claim 10, wherein the type of specific data block and physical block comprises single-level cells (SLCs), multi-level cells (MLCs), triple-level cells (TLCs), and quadruple-level cells (QLCs), and the count value corresponding to the SLCs, MLCs, TLCs, and QLCs are 1, 2, 3, and 4, respectively.

12. The method as claimed in claim 8, further comprising:
obtaining a data scheduling ratio by dividing a first number of a plurality of logical pages in each data block composed of the data of the host command by a second number of the group-mapping tables corresponding to the logical pages of each data block, and a size of each group-mapping table equals that of each logical page.

13. The method as claimed in claim 12, further comprising:
when the updated group-mapping tables are to be written into the flash memory, copying the group-mapping table corresponding to each data block to be stored to obtain backup group-mapping tables corresponding to each data block to be stored.

14. The method as claimed in claim 13, further comprising:
every time that the first number of logical pages has been written into the active blocks of the flash memory, writing the backup group-mapping table corresponding to the first number of logical pages into the flash memory.

* * * * *